Patented Mar. 10, 1953

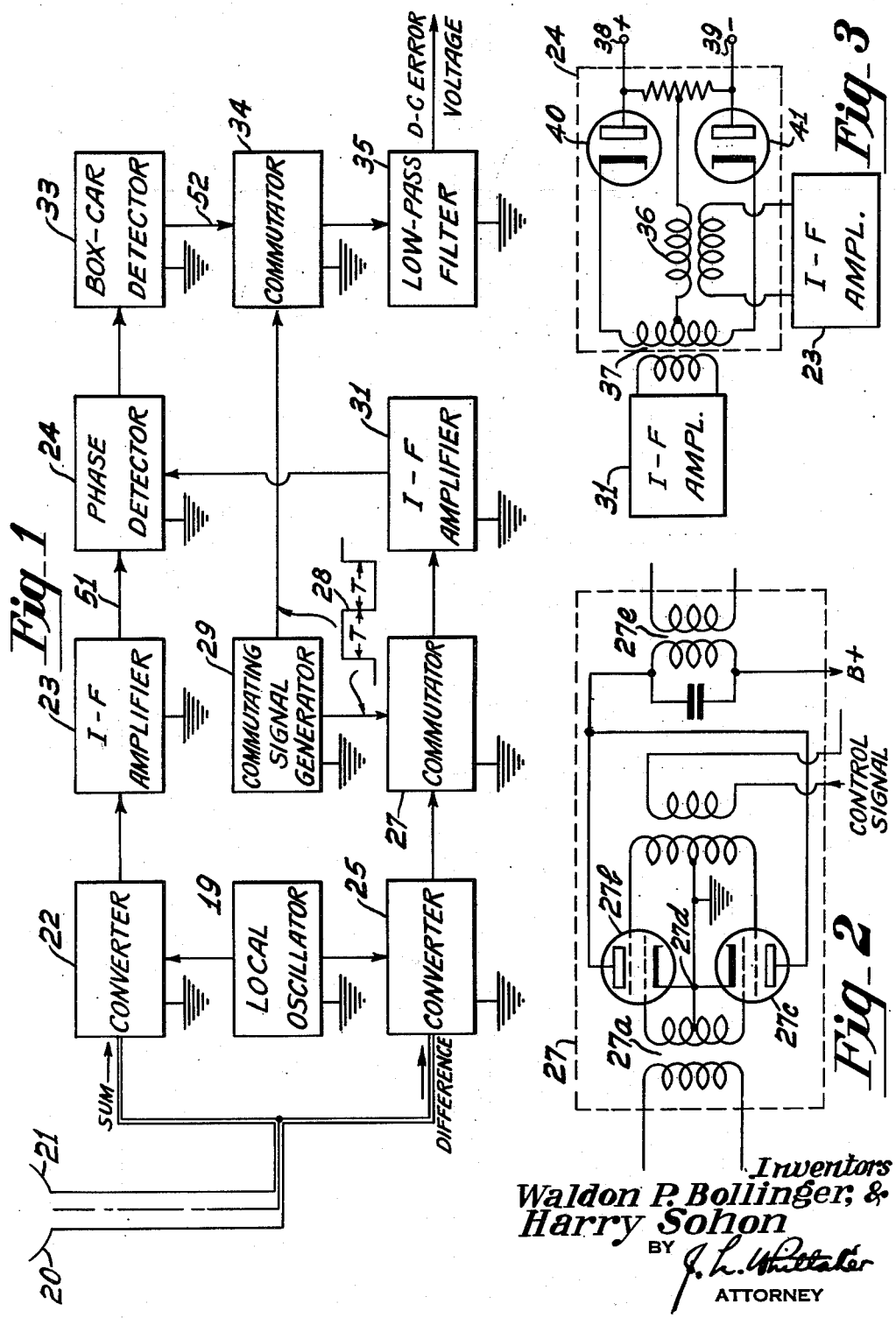

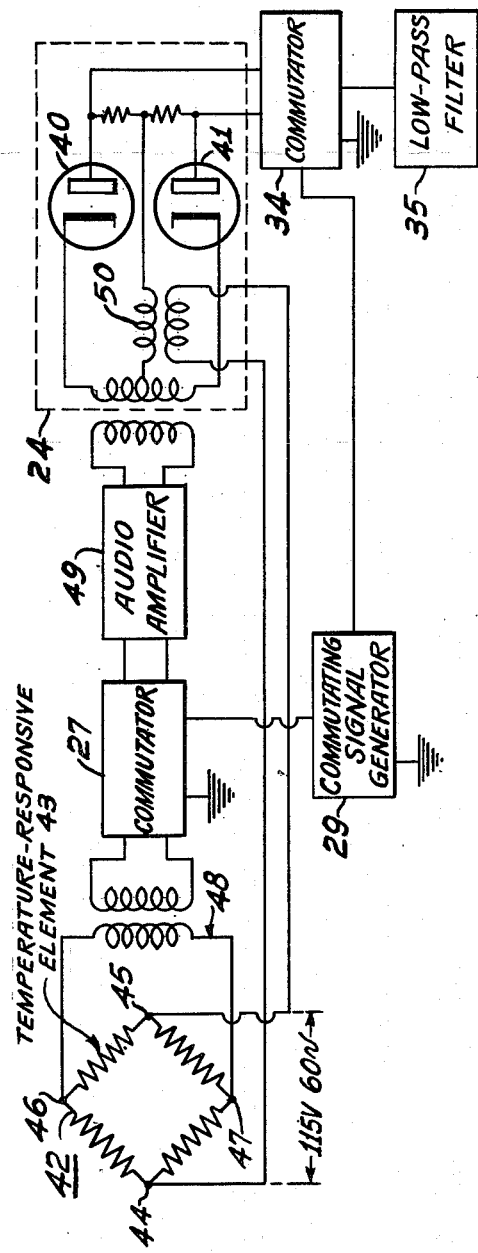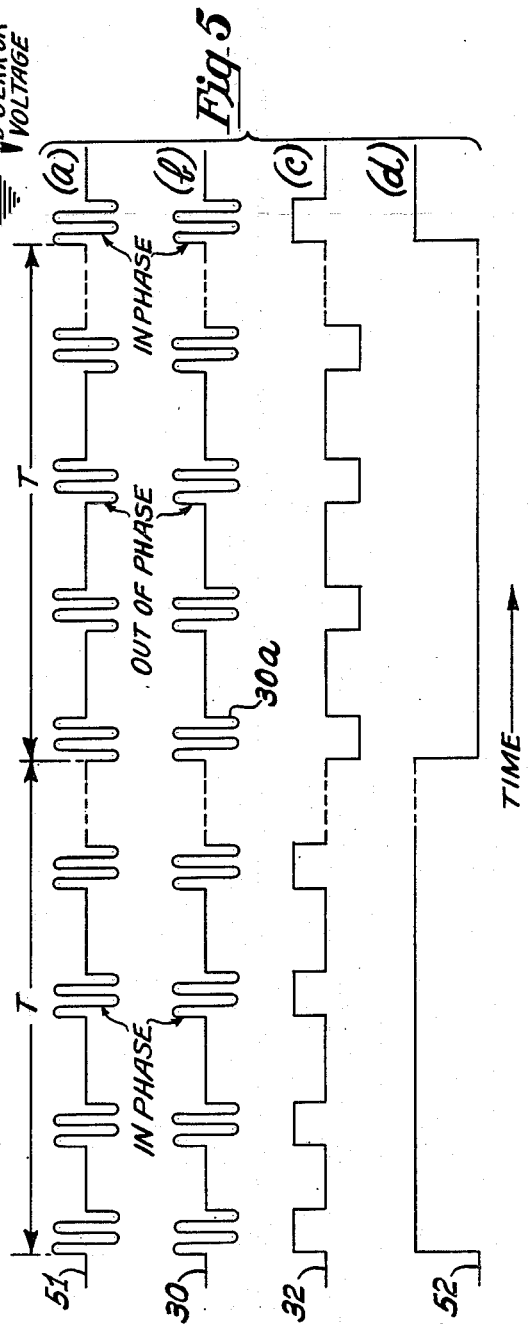

2,631,279

UNITED STATES PATENT OFFICE 2,631,279

ERROR SIGNAL CONTROL CIRCUIT

Waldon P. Bollinger, Haddonfield, N. J., and Harry Sohon, Havertown, Pa., assignors to Radio Corporation of America, a corporation of Delaware Application June 21, 1949, Serial No. 100,375

8 Claims. (Cl. 343—16)

This invention relates to control circuits for electrical apparatus, and more particularly to control circuits that are designed and arranged to produce an output that is proportional in amplitude to the indicated error in the operation of the associated controlled circuit and that has a polarity indicative of the direction of the error.

Control circuits of the type specified may produce a finite error signal when the controlled apparatus is, in fact, operating in the desired mode. This finite error signal may be the result of D.-C. drift, contact potentials, and phase errors in the circuit elements that comprise the control circuit. In systems in which fine regulation of operation is necessary, potentials of the magnitude of those produced by imperfections in the component circuit elements of the control circuit may appear as a true error signal in the output of the control circuit and cause the control circuit to initiate an incorrect readjustment of the controlled circuit operation.

It is one of the objects of this invention to provide a highly sensitive control circuit that is responsive only to actual error signals.

A further object of the invention is to provide a control circuit in which the effects of unstable D.-C. characteristics in the component circuit elements are eliminated from the error or control signal output of the control circuit.

A further object of the invention is to provide a method of and means for eliminating errors resulting from contact potentials or phase shift in electrical circuits of a system in which two paths of information are combined and compared to obtain a control signal for adjusting the performance of a controlled system with which the method and means are utilized.

The invention is generally applicable to all types of control systems in which two paths of information are combined to obtain a control signal having an amplitude proportional to the indicated error and a polarity indicative of the direction of the error. Control circuits of this type are widely used in direction finders, temperature control systems, and in systems that automatically position the antenna array of a radar system.

To facilitate an understanding of the invention, the invention is hereinafter described specifically with reference to a simultaneous lobing type radar system and a temperature control system. It will be understood, however, that the principles explained with reference to the specific embodiments mentioned are equally applicable to a wide variety of control circuits generally similar in their functional operation to the type described.

In the drawings:

Figure 1 is a block diagram illustrating the manner in which the invention may be utilized in conjunction with a simultaneous lobing type radar system;

Figure 2 is a simplified schematic diagram of one type of commutator circuit that may be employed in utilizing the invention;

Figure 3 is a simplified schematic diagram of one type of circuit that may comprise the phase detector of Figures 1 and 4;

Figure 4 is a simplified schematic diagram of an embodiment of the invention disclosed in conjunction with a temperature control system, and Figure 5 is a group of graphs illustrative of pulse waveforms in selected portions of the circuit described by reference to Figure 1.

Similar reference characters are applied to similar elements throughout the drawing.

In Figure 1 an embodiment of the invention is shown in conjunction with a simultaneous lobing type radar system which is provided with a receiver feed system 20 designed to extract a sum pattern, or a sum and difference pattern, from the reflected transmitter signals, depending upon the position of the signal reflecting object relative to the central axis of the antenna array 21. In the event that the object from which the ranging pulse propagated by the transmitter of the system is reflected, is displaced to either side of the central axis of the antenna array 21 both a vector sum or reference and a vector difference signal will be obtained, the difference signal having a phase with respect to the sum, or reference signal of plus or minus 90° depending upon the direction from the central axis of the antenna array that the reflecting object is located. When the reflecting object is positioned on the central axis of the antenna array, no difference signals are received, as is well known in the operation of systems of this type. Reference may be made to U. S. Patent No. 2,456,666 to C. S. Agate et al., issued December 21, 1948, which discloses one example of an antenna array system in which such sum and difference signals are derived.

A sum signal thus obtained is applied to the first receiver channel which comprises a first converter 22 in which the sum signal is heterodyned by signals from a local oscillator 19 to an intermediate frequency signal which is amplified in the intermediate-frequency amplifier 23 and thereafter passed to the phase detector 24. The difference signal, which has a phase with respect to the sum signal that is indicative of the direction of the antenna error, is applied to the second receiver channel which includes a second converter 25. The signal output of the second converter 25 is passed to a commutator 27, described in greater detail by reference to Figure 2 of the drawing, in which the phase of the signal is periodically reversed by the application of a square wave commutating signal 28 originated in the commutating signal generator 29. Repetition rates of this square wave should be equal to or greater than error occurrences resulting from the aforementioned instabilities of the system.

The commutator 27 may comprise a circuit of the type, illustrated in Figure 2, which may be coupled to the preceding stage by the coupling transformer 27a. The grids of the tube elements 27b and 27c are connected to the secondary winding of transformer 27a in push-pull relationship. The plates of the tubes 27b and 27c are connected in parallel and the center tap 27d is grounded, so that no output is obtained in the plate circuit 27e when both tubes are conducting. However, in the instance when a control signal is applied in push-pull to the grids or the suppressor grids of the tubes 27b or 27c, which will block the one tube and permit the other tube to conduct, an output will be obtained in the plate circuit 27e and the phase of the output will be reversed when the conducting tube is turned off and the nonconducting tube turned on by a control signal. In order to have only one tube at a time conduct, it is necessary that the control signal also be applied in push-pull. The square pulse signal 28 supplied to the commutator 27 by the commutating signal source 29 is shown as having a pulse width T and the application of the signal 28 to the commutator will cause the converted pulse input signals to the commutator to be reversed in phase periodically as indicated at 30, 30a, in Figure 5(b), which represents the output of the commutator. The fundamental frequency or frequency of recurrence of the square wave is substantially less, say one tenth or less, as illustrated, than the phase reversed signal voltage.

The output 30, 30a of the commutator 27, which is thus periodically being reversed in phase, is amplified in the second I.-F. amplifier 31 and applied to the phase detector 24 wherein a comparison of the phase of the difference signal is made with reference to the sum signal and an output developed whose polarity is dependent on the direction in which the phase of the difference signal differs from that of the sum signal. As the phase of the difference signal 30, 30a, is being reversed periodically by the application of the commutating signal 28, the output of the phase detector 24 will be a signal 32, shown in Figure 5(c) similar in form to the commutating signal 28, wherein the excursion of the signal in either direction, as the phase of the difference signal is periodically reversed, will be representative of the amplitude of the difference signal.

The output 32 of the phase detector 24 is applied to a boxcar detector 33 which functions to lengthen the narrow applied pulse signal 32 and provide a control voltage 52, shown in Figure 5(d) for the subsequent stages of the control circuit for an effectively long period. A typical detector of this type is described in "Cathode-Ray Tube Displays," by T. Soller, M. A. Starr and G. E. Valley, Jr., Radiation Laboratory Series, vol. 22 (1948), page 198.

It may be noted that the output of the boxcar detector 33 will comprise components from sources other than the difference signal as, for example, components resulting from phase instabilities in the I.-F. amplifiers, contact potentials in the phase detector and boxcar detector and D.-C. leaks from gating circuits that may be included in the receiver system. The output signal thus comprised is applied to a second commutator 34 which also is commutated at the same rate as the commutator 27 by the commutating signal 28. This second commutator circuit 34 reestablishes the sense to the difference signal and periodically alters the direction of the unidirectional fixed errors in the system originated in the various sources mentioned above.

The output of the second commutator 34 is then applied to the low-pass filter 35 in which the difference signal, previously commutated in the first commutator 27 and subsequently synchronously rectified to D.-C. in the second commutator 34, is passed as a D.-C. error voltage having an amplitude proportional to the error and a polarity indicative of the direction of the error. The signals resulting from irregularities in the operation of the component elements in the system, as previously noted, which have been commutated in the second commutator circuit 34, are in effect alternately added to and subtracted from the desired output signal from the boxcar detector 33 and are filtered out as an A.-C. component.

The exact manner in which a circuit arranged in the described form effectively eliminates control errors that would otherwise result from contact potentials and phase instabilities in the system, may be better understood by considering the operation of the system where, for example, the phase detector 24 comprises a balanced circuit of the type illustrated in simplified schematic diagram, Figure 3.

The amplifiers 23 and 31 are transformer-coupled to the phase detector 24 through the center-tap coil 36 and the secondary coil 37, respectively. The circuit is arranged so that no output will be obtained at the terminals 38 and 39 in the absence of a signal from the amplifier 31. When, however, a signal is supplied from the amplifier 31 either the diode 40 or 41 will conduct depending upon the phase of the signal suplied by the amplifier 31 with reference to the phase of the sum or reference signal supplied by the amplifier 23, and the polarity of the signal appearing on the terminals 38 and 39 being representative of the direction in which the phase of the signal from the amplifier 31 differed with respect to the phase of the signal applied from the amplifier 23. As is unavoidable, one of the diodes 40 or 41 may have a higher contact potential than the other diode and, consequently, even though no signal is being applied through the amplifier 31, thus indicating that the control system is properly balanced, the difference in the contact potential between the diodes will cause a signal to appear at the terminals 38 and 39 depending upon which of the diodes has the higher contact potential. The signal thus produced will initiate an improper readjustment of the controlled system or in the event difference signal is being applied to the phase detector, the commutation will cause a greater excursion of the square wave output in one direction than in the other. Errors of this nature resulting from D.-C. contact potentials in various circuits of the system, as well as from phase instabilities in the amplifiers thereof, are passed to the second commutator 34 and are in effect alternately added to and subtracted from the desired error signal from the detector 33 and are subsequently filtered out as an A.-C. component in the low-pass filter 35. Consequently, the error voltage obtained from the filter 35 will be exactly representative of the difference signal applied to the converter 25 with respect to indicating the magnitude and the direction of the error with which the antenna array 21 is being positioned.

The manner in which the invention may be employed with other control systems utilizing two paths of information that are compared in a single device or comparator to obtain a control voltage indicative of the magnitude and the direction of the error with which the controlled system is operating, and which voltage may be employed to correct the error thus indicated, is illustrated in Figure 4. In this figure there is shown a temperature control system comprising a balanced bridge 42 that includes a temperature sensitive element 43 which may be inserted in the area the temperature of which is to be controlled. An alternating current operating potential is applied to the terminals 44 and 45, and in the event the temperature in the controlled area varies from that for which the bridge has been balanced, a current will flow from across terminals 46 and 47 into circuit 48 which circuit is transformer-coupled to the audio amplifier stage 49. The direction of current flow in the circuit 48 is dependent upon the direction of variance of the temperature in the controlled area from the selected temperature for which the bridge has been balanced, and the directional information is realized by comparing the phase of the current passing in the circuit 48 with the phase of the reference current which is taken from across the operating potential terminals of the bridge and applied to the phase detector 24 through the center tap transformer 50. The input of the one path of information to the audio amplifier 49 is commutated in the same manner as the difference signal input to the I.-F. amplifier 31 is commutated in the system illustrated in Figure 1. The output of phase detector 24 of Figure 4 is passed to the second commutator 34 where the output is commutated similarly to the output of the detector 33 of the system illustrated in Figure 1. Correspondingly, the undirectional fixed errors in the system will be alternately added to and substracted from the desired output from the phase detector 24 and will be filtered out as an A.-C. component in the low-pass filter 35 while the previously commutated error signal will be synchronously rectified and passed as a D.-C. error voltage from the low-pass filter. This voltage will have an amplitude proportional to the error signal alone and a polarity indicative of the direction of the error. The error voltage thus obtained may be employed to readjust the operation of the controlled system in any well known manner, as by controlling heaters or blowers.

There has thus been disclosed a method and means for eliminating the effect of phase instabilities, contact potentials and gating imperfections in a control system utilizing two paths of information which are subsequently compared to obtain a signal indicative of the error and the direction of the error. The arrangements disclosed herein are equally applicable to direction finders and other similar systems that employ the described principle. The explanation of the invention with reference to a simultaneous lobing radar system and a temperature control system is not intended to restrict the invention to systems of those specific types otherwise than indicated in the appended claims.

We claim as our invention:

1. An electrical control circuit comprising: a phase detector, means for applying a phase reference signal of known frequency to said detector, means for applying an error signal of the same said frequency to said detector, said error signal having a phase with respect to said reference signal indicative of the departure of an associated controlled system from its desired performance, means for periodically reversing the phase of said error signal at a rate less than the frequency of said reference signal and prior to its application to said detector, means for synchronously with the first named phase reversal reversing the phase of the output of said phase detector, and means for filtering out the alternating current component of the output of said last named phase altering means.

2. An electrical control circuit comprising: a phase detector, means for applying a phase reference signal of known frequency to said detector, means for applying an error signal of the same said frequency to said detector, said error signal having a phase with respect to said reference signal indicative of the departure of an associated controlled system from its desired performance, means for periodically reversing at a rate less than said frequency the phase of the said error signal, means for reversing the phase of the output of said phase detector synchronously with the first named phase reversal, and means for filtering out the alternating current component of the output of said last named phase reversing means.

3. An electrical control system as defined in claim 2 characterized by the said means for reversing the phase of the said error signal and said means for reversing the phase of said output of said phase detector comprising: a circuit having two modes of operation, the output of the circuit in one mode being reversed in phase with respect to the output of the circuit in the other mode, means for generating a square wave voltage of fundamental frequency less than said frequency, and means for applying said voltage to said circuit to periodically alter the mode of operation of said circuit.

4. A control system including: a signal comparator, means for applying two sources of signals each of the same first frequency to said comparator, means for periodically reversing the phase of one of the applied signals at a second frequency less than said first, and means for commutating the output of said comparator in synchronism with the said periodic phase reversal.

5. A simultaneous lobing radar system including: a receiver component having an antenna feed system arranged to extract a vector sum signal and a vector difference signal from high frequency energy radiated from an object and received by said antenna, a phase detector, means for periodically reversing the phase of said difference signal from the feed system at a frequency substantially less than said high frequency and applying said difference signal with periodically reversed phase to said detector, means for applying the sum signal to said detector, means for commutating the output of said phase detector synchronously with respect to the said phase reversals of said difference signal, and means for filtering out the alternating current component of the output of said last named commutating means.

6. A simultaneous lobing radar system defined in claim 5 characterized by the said commutating means operating at a repetition rate equal to or greater than the error occurrences in the system.

7. A simultaneous lobing radar system defined in claim 5 characterized by the said means for periodically reversing phase of said difference signal and said means for commutating the output of said phase detector each comprising: a circuit having two modes of operation, the output of the circuit in one mode being reversed in phase with respect to the output in the other mode, means for generating a square wave voltage and means for applying the said voltage to said circuit to periodically change the said circuit from one mode of operation to the other.

8. A simultaneous lobing radar system as defined in claim 5 characterized by said receiver component including: separate means for heterodyning said sum and said difference signals to intermediate frequencies substantially higher than said phase reversing frequency, means for applying said difference intermediate frequency signal to said difference signal phase reversing means, means for amplifying said sum intermediate frequency signal and applying the amplified sum signal to said phase detector, means for applying the periodically reversed difference signal to said phase detector, and means connected to said phase detector and said commutating means for elongating the pulse output of said phase detector and sustaining an input to said commutator.

WALDON P. BOLLINGER.
HARRY SOHON.

REFERENCES CITED

The following references are of record in the file of this patent:

UNITED STATES PATENTS

| Number | Name | Date |
|---|---|---|
| 2,113,164 | Williams | Apr. 5, 1938 |
| 2,114,298 | Gunn | Apr. 19, 1938 |
| 2,150,006 | Parker et al. | Mar. 7, 1939 |
| 2,366,618 | Harrison | Jan. 2, 1945 |
| 2,413,788 | Sargeant et al. | Jan. 7, 1947 |
| 2,429,466 | Jones | Oct. 21, 1947 |
| 2,467,361 | Blewett | Apr. 12, 1949 |
| 2,508,082 | Wald | May 16, 1950 |
| 2,509,207 | Busignies | May 30, 1950 |
| 2,512,702 | White, Jr. | June 27, 1950 |
| 2,539,127 | Glass | Jan. 23, 1951 |